(12) United States Patent
Knapp

(10) Patent No.: US 7,042,654 B2
(45) Date of Patent: May 9, 2006

(54) OPTICAL SYSTEM HAVING A TRANSMISSION OPTICAL CORRECTOR WITH A SELECTIVELY NONUNIFORM PASSIVE TRANSMISSION OPTICAL PROPERTY

(75) Inventor: David J. Knapp, Tucson, AZ (US)

(73) Assignee: Raytheon Company, Waltham, WA (US)

( * ) Notice: Subject to any disclaimer, the term of this patent is extended or adjusted under 35 U.S.C. 154(b) by 11 days.

(21) Appl. No.: 10/633,811

(22) Filed: Aug. 4, 2003

(65) Prior Publication Data

US 2005/0030644 A1    Feb. 10, 2005

(51) Int. Cl.
*G02B 13/18*    (2006.01)
*G02B 3/02*    (2006.01)
(52) U.S. Cl. .................. 359/708; 359/642; 359/718
(58) Field of Classification Search ............... 359/708, 359/718, 642
See application file for complete search history.

(56) References Cited

U.S. PATENT DOCUMENTS

| 4,245,890 A | 1/1981 | Hartman et al. |
| 4,384,759 A | 5/1983 | Ferrante |
| 4,641,927 A | 2/1987 | Prescott et al. |

(Continued)

FOREIGN PATENT DOCUMENTS

EP    0 616 187 A    9/1994

OTHER PUBLICATIONS

Michael H. Hayford, "Optical system design using holographic optical elements," *Proc of SPIE, vol. 0531, Geometric Optics*, ed. Fischer, Price, Smith, pp. 241-255 (Jan. 1985).

(Continued)

*Primary Examiner*—Scott J. Sugarman
(74) *Attorney, Agent, or Firm*—Thomas J. Finn; Leonard A. Alkov; Karl A. Vick

(57) ABSTRACT

An optical system includes a window having a nonspherically curved outer surface and a curved inner surface, and a transmission optical corrector adjacent to the curved inner surface of the window. The transmission optical corrector has a selectively nonuniform passive transmission optical property, such as a spatially varying index of refraction of the transmission optical corrector or a spatially varying diffractive property of the transmission optical corrector. The optical system further has an optical train positioned such that the transmission optical corrector lies between the curved window and the optical train. A sensor is disposed to receive the optical ray passing sequentially through the window, the transmission optical corrector, and the optical train.

35 Claims, 4 Drawing Sheets

U.S. PATENT DOCUMENTS

| | | | |
|---|---|---|---|
| 4,902,100 A * | 2/1990 | Reynolds et al. | 359/15 |
| 5,136,428 A | 8/1992 | Ray | |
| 5,946,143 A | 8/1999 | Whalen | |
| 6,009,564 A | 1/2000 | Tackles et al. | |
| 6,028,712 A | 2/2000 | McKenney et al. | |
| 6,091,548 A | 7/2000 | Chen | |
| 6,310,730 B1 | 10/2001 | Knapp et al. | |
| 6,313,951 B1 | 11/2001 | Manhart et al. | |
| 6,343,767 B1 | 2/2002 | Sparrold et al. | |
| 6,462,889 B1 | 10/2002 | Jackson | |
| 6,552,318 B1 | 4/2003 | Crowther et al. | |

OTHER PUBLICATIONS

L.D. Foo et al., "Design Examples of Hybrid Refractive-Diffractive Lenses," *Proc. of SPIE vol. 1168, Current Developments in Optical Engineering and Commercial Optics*, ed. R.E. Fischer et al., pp. 117-125 (Dec. 1989).

C. William Chen, "Application of diffractive optical elements in visible and infrared optical systems," *Critical Review vol. CR41, Lens Design*, ed. Warren J. Smith, pp. 158-172 (Jan. 1992).

Warren J. Smith, *Modern Optical Engineering*, McGraw Hill, pp. 296-297 and 413-418 (2000).

* cited by examiner

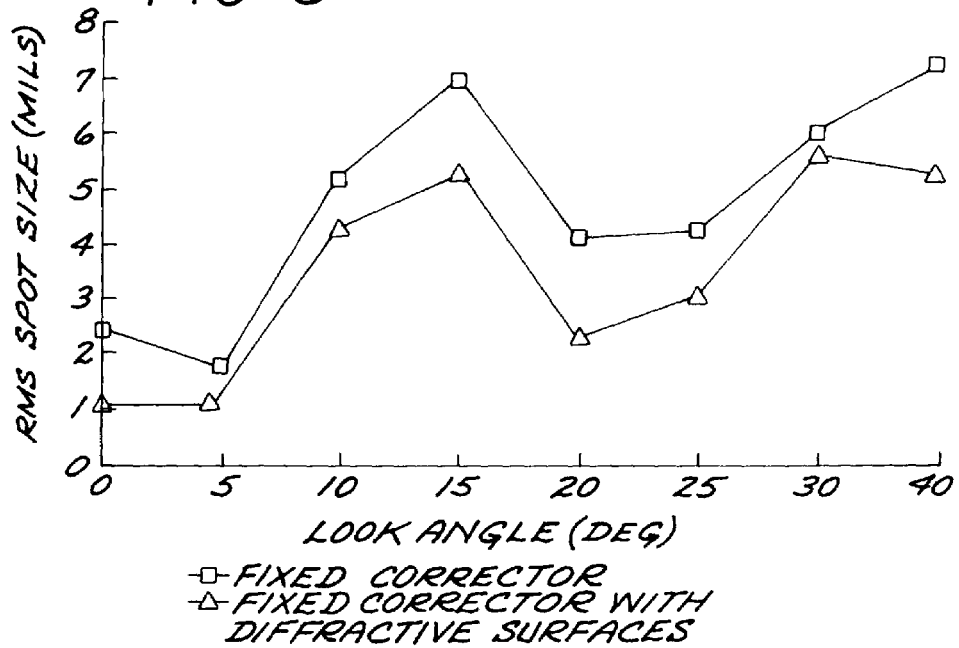
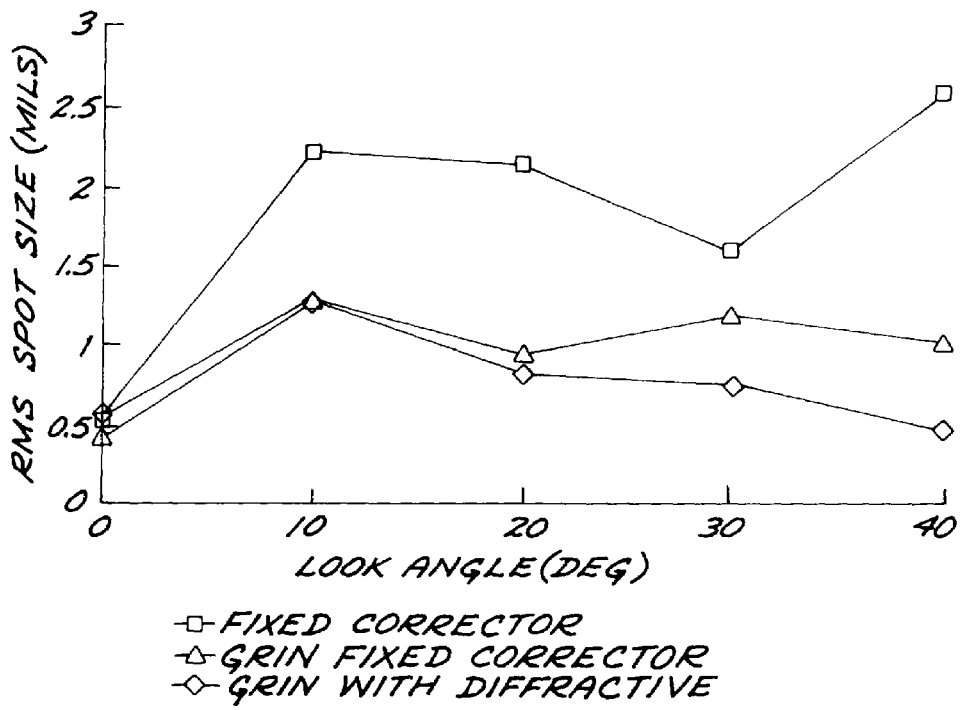

OPTICAL SYSTEM HAVING A TRANSMISSION OPTICAL CORRECTOR WITH A SELECTIVELY NONUNIFORM PASSIVE TRANSMISSION OPTICAL PROPERTY

This invention relates to an optical system having a window therein, and in particular to such an optical system having a transmission optical corrector whose transmissive optical properties are selectively nonuniform.

BACKGROUND OF THE INVENTION

An optical sensor receives radiated optical energy from a scene and converts it to an electrical signal. The electrical signal is provided to a display or further processed for pattern recognition or the like. Optical sensors are available in a variety of types and for wavelengths ranging from the ultraviolet, through the visible, and into the infrared. In some applications the optical sensors are fixed in orientation, and in others the optical sensors are movable by pivoting and/or rotational motions to allow sensing over a wide angular field of regard.

The optical sensors generally employ a photosensitive material that faces the scene and produces an electrical output responsive to the incident energy. The photosensitive material and remainder of the sensor structure are rather fragile, and are easily damaged by dirt, erosion, chemicals, or high air velocity. In service, the sensor is placed behind a window through which it views the scene and which protects the sensor from such external effects. The window must be transparent to the radiation of the operating wavelength of the sensor and resist attack from the external forces. The window must also permit the sensor to view the scene over the specified field of regard.

The window would ideally introduce no wavefront aberration at the center of the field of view, other than possibly spherical aberration, particularly if the sensor is an imaging sensor. The thicker and more highly curved is the window, the more likely is the introduction of significant wavefront aberration. A wide variety of sensor windows have been used in various aircraft applications. In many cases such as low-speed commercial helicopters, flat windows are acceptable. Windows that are shaped as segments of spheres are used in aircraft and missile applications, but for these windows the wavefront aberration tends to be high if the gimbal location is not at the spherical window's center of curvature. In all of these window types, if the window must be wide or must project a substantial distance into an airflow to permit a large field of regard, the aerodynamic drag introduced by the window is large.

For applications involving aircraft (including missiles) operating at high speeds, the window should be relatively aerodynamic such that the presence of the window extending into the airstream does not introduce unacceptably high and/or asymmetric aerodynamic drag to the vehicle. A nonspherical or conformal window is therefore beneficial to reducing drag and increasing the speed and range of the aircraft. However, available conformal windows introduce large wavefront aberrations into the sensor beam, particularly for high azimuthal pointing angles of the sensor.

The wavefront aberration may be corrected computationally, but the amount of processing may be great. To reduce the amount of computation or eliminate the need for computation, the wavefront aberration of the image may be minimized optically, either in the optical processing components or by providing a particular shape in the window, although the latter is not preferred because it is desired to select the shape of the window for aerodynamic rather than optical reasons. Corrective optics may also be provided, and a variety of corrector architectures and techniques have been developed.

It is always desired to improve the optics still further. Accordingly, there is a need for an improved approach to providing a corrected image in an optical system viewing a scene through an aspheric window. The present invention fulfills this need, and further provides related advantages.

SUMMARY OF THE INVENTION

The present invention provides an approach for improving the optical performance of an optical system with a nonspherical window and a transmission optical corrector. This approach may be implemented with modifications to any of a variety of transmission optical corrector designs, including those now available and those that may be subsequently developed. The present approach does not increase either the weight or the size of the optical corrector, or require additional computational correction, but it results in improved optical performance, particularly for windowed optical systems having a high field of regard.

In accordance with the invention, an optical system comprises a window having a nonspherically curved outer surface and a curved inner surface, and a transmission optical corrector adjacent to the curved inner surface of the window and having an optical corrector shape responsive to a shape of the window. The transmission optical corrector has a selectively nonuniform passive transmission optical property, such as a spatially varying index of refraction of the optical corrector, and/or a spatially varying diffractive property of the optical corrector, and/or a spatially varying light absorption of the transmission optical corrector. The optical system further includes an optical train positioned such that the transmission optical corrector lies between the curved window and the optical train. The optical train includes at least one optical element operable to alter an optical ray incident thereon, and a sensor disposed to receive the optical ray passing sequentially through the window, the transmission optical corrector, and the optical train.

The transmission optical corrector may be a fixed optical corrector or a movable optical corrector. The transmission optical corrector may be a dome-type optical corrector or an arch optical corrector, in either case made of transparent material having a curvature different from a curvature of the window. Light passes through the transmission optical corrector.

The greatest benefits of the present approach are realized when the sensor has a field of regard of at least about 10 degrees, and preferably greater than about 20 degrees, through the window, the transmission optical corrector, and the optical train.

In prior approaches, the transmission optical corrector has a single index of refraction throughout, or has not had a diffractive, or has a constant absorption. Although these approaches are operable, the studies performed in conjunction with the present invention have demonstrated that even better optical performance may be achieved by providing the transmission optical corrector with a selectively nonuniform passive transmission optical property. That is, the structure of the transmission optical corrector is made selectively nonuniform, so that its transmission optical properties vary according to the look angle through the window. Three preferred techniques for selectively varying the transmission optical properties are using a gradient-index-of-refraction material to form the transmission optical corrector, using a diffractive to alter the light path that passes through the transmission optical corrector, or varying the absorption of light across the transmission optical corrector.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 6 is a calculated graph of RMS spot size as a function of look angle, for a fixed transmission optical corrector and for a fixed transmission optical corrector with a diffractive surface;

FIG. 7 is a calculated graph of RMS spot size as a function of look angle, for a fixed transmission optical corrector, for a fixed transmission optical corrector having a gradient index of refraction, and for a fixed transmission optical corrector having both a gradient index of refraction and a diffractive surface;

DETAILED DESCRIPTION OF THE INVENTION

Figure 1:
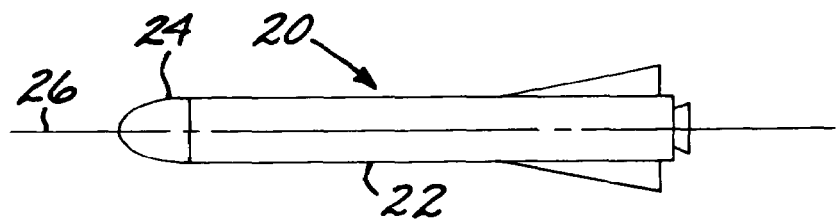
FIG. 1 is an elevational view of a missile having a nose-dome window.

FIG. 1 depicts a flight vehicle 20, in this case a supersonic missile, having a fuselage 22 with a curved window 24 attached thereto. The window 24 is illustrated as a forward-facing, non-spherical, conformal nose dome that protrudes at least partially into the airstream of the flight vehicle 20. The fuselage 22 is elongated along an axis of elongation, termed the boresight axis 26. In a preferred application the window 24 is rotationally symmetric about the boresight axis 26, although that need not be the case. The flight vehicle 20 with the nose-dome window 24 is the preferred application of the optical system of the invention, but it is applicable in other contexts as well such as other missile windows and windows on manned aircraft. The optical system may also be part of a imaging system where the sensor is the human eye, such as a helmet with a window, a goggle, or an eyeglass. Such an optical system is preferably a human-head-mounted imaging system.

Figure 2:
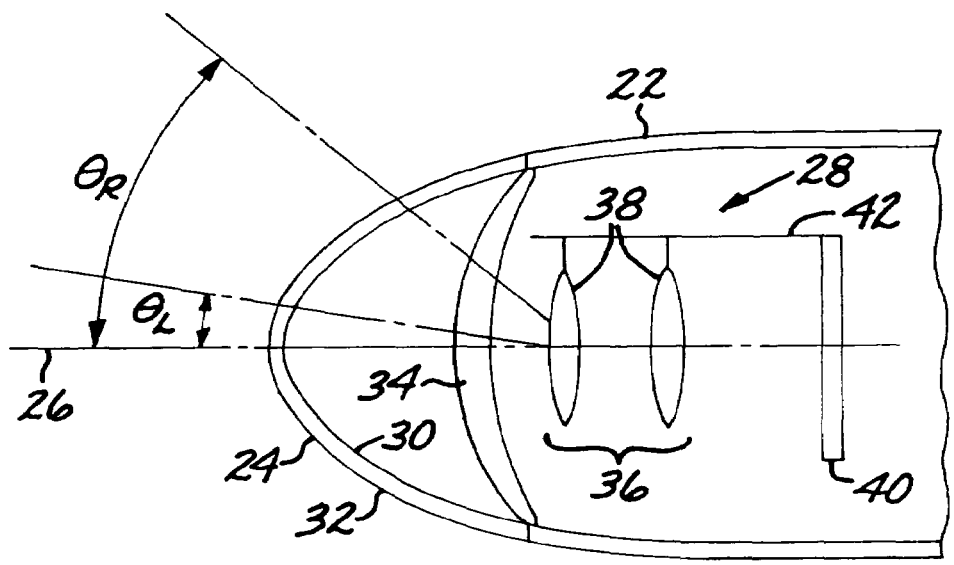
FIG. 2 is a schematic view of an optical system wherein the transmission optical corrector has a selectively nonuniform passive transmission optical property.

The window 24 is part of an imaging optical system 28, which is shown schematically in FIG. 2. The optical system 28 includes the window 24 attached to the fuselage 22, which serves as a housing for the remainder of the components of the optical system 28. The window 24 is a curved piece made of a material transparent to the radiation being sensed by the optical system 28 and its sensor. For example, for a visible-radiation optical system, the window 24 may be glass or plastic; for an infrared-radiation optical system, the window 24 may be magnesium fluoride or zinc sulfide. A nonspherically curved inner surface 30 of the window 24 is the concave surface of the window 24 that faces the inside of the fuselage 22. A nonspherically curved outer surface 32 of the window 24 is the convex surface of the window 24 that faces outwardly and projects forwardly into the airstream as the flight vehicle 20 flies. The shape of the outer surface 32 is selected, for a conformal window 24, largely for aerodynamic considerations. The shape of the inner surface 30 generally follows, but typically does not exactly duplicate, the shape of the outer surface 32, to keep the window 24 relatively thin to minimize optical distortion. The window 24 in general has a spatially dependent curvature.

A transmission optical corrector 34 is located adjacent to the inner surface 30 of the window 24. (As used herein, "transmission" distinguishes the use of transmissive optical elements from reflective optical elements. The optical rays of the optical path pass through the transmission optical corrector 34.) The transmission optical corrector 34 is a curved piece made of a material transparent to the radiation being sensed by the optical system 28 and its sensor. For example, for a visible-radiation optical system, the optical corrector 34 may be glass, and for an infrared-radiation optical system, the window 24 may be magnesium fluoride, AMTIR3, or other infrared-transparent material. The transmission optical corrector 34 may be in any operable physical form, such as a dome or an arch. The transmission optical corrector 34 has an optical corrector shape responsive to a shape of the window 24. That is, the shape of the transmission optical corrector 34 is designed in conjunction with the shape selected for the window 24, so as to ultimately minimize distortion of the viewed scene.

An optical train 36 is positioned such that the optical corrector 34 lies along the optical path between the window 24 and the optical train 36. The optical train 36 includes at least one optical element operable to alter an optical ray incident thereon. In FIG. 2, the optical train 36 is illustrated schematically as two refractive lenses 38, but it may also, or instead, include a mirror, a prism, or any other operable optical element. The optical train 36 may also include a combination of lenses, mirrors, prisms, and/or other optical elements. The detailed design of optical trains is known in the art, and the present invention is not concerned with such design specifics.

The optical train 36 directs incident optical rays, which previously passed first through the window 24 and then through the optical corrector 34, to a sensor 40. The sensor 40 may be a manufactured sensor or a human eye. In each case, the sensor 40 forms an image of the scene viewed through the window 24, the transmission optical corrector 34, and the optical train 36. The sensor 40 is illustrated as a manufactured focal plane array (FPA) sensor, but it may be of any operable type. The sensor 40 is selected according to the nature of the energy to be sensed, and is typically a sensor of visible light or infrared energy. The design and fabrication of such manufactured sensors 40 is known in the art. The sensor 40 provides its image output as an electrical signal to processing electronics, which are not illustrated but which are known in the art. The sensor 40 may instead be a human eye, in which case the imaging optical system 28 is preferably mounted on and supported by the head of the user.

Preferably for the preferred case of the manufactured sensor 40, the optical corrector 34, and/or the optical train 36, and/or the sensor 40 are mounted on a movable optical support 42. In the schematic example of FIG. 2, the optical train 36 and the sensor 40 are illustrated as mounted on the movable optical support 42, and the optical corrector 34 is stationary. The movement characteristics of the optical support 42 are selected to permit the optical corrector 34, the optical train 36, and/or the sensor 40 to point in the desired directions, and also to take advantage of the corrective properties of the transmission optical corrector 34. Any operable type of movable optical support 42 may be used, including, for example, roll/nod gimbals and X-Y rotational gimbals. Axial translation movements may also be used, either separately or in combination with the rotational movements. The movable optical support 42 may include a single movement or separate movements for any or all of the optical corrector 34, the optical train 36, and the sensor 40, but the various movements are coordinated either mechanically or electronically. The combination of movements of the movable optical support 42 allows the optical system 28 to be pointed in any desired rotational and azimuthal direction, termed the look angle $\theta_L$ within a field of regard $\theta_R$. The field of regard $\theta_R$ is the largest look angle that may be practically used, with acceptable aberration of the image.

Except for the improvements to be discussed next, a variety of such optical trains are known in the art. Examples are disclosed in U.S. Pat. Nos. 5,946,143; 6,009,564; 6,028,712; 6,310,730; 6,313,951; 6,343,767; 6,462,889; and 6,552,318, whose disclosures are all incorporated by reference.

In the present approach, the transmission optical corrector 34 has a selectively nonuniform passive transmission optical property. That is, the optical characteristics of the optical corrector 34 vary as a function of location on the optical corrector, or, alternatively stated, the optical property of the corrector varies as a function of the look angle $\theta_L$ and possibly other variables. In a preferred approach of a rotationally symmetric window 24 and transmission optical corrector 34, the optical transmission characteristics of the optical corrector 34 are rotationally symmetric about the boresight axis 26, but they need not be.

Figure 3:
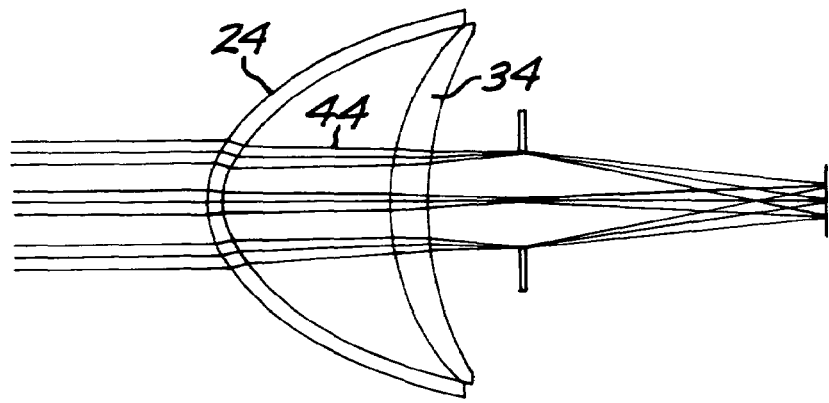
FIG. 3 is a portion of the optical system of FIG. 2, and additionally showing the ray paths through the lens at a low look angle.
Figure 4:
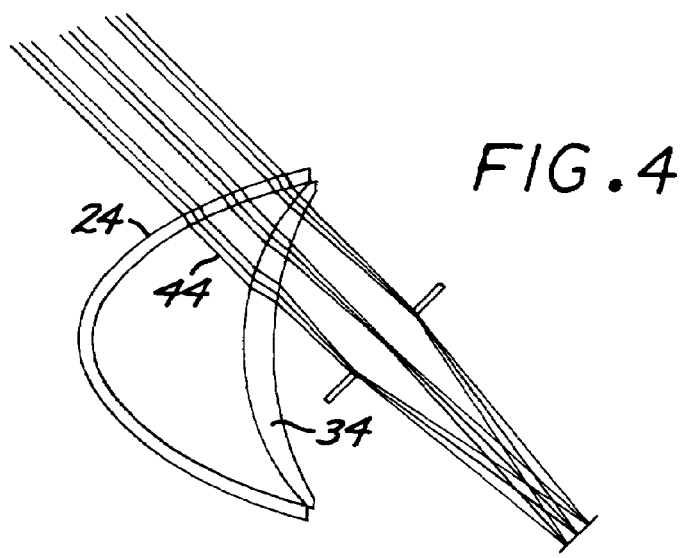
FIG. 4 is a portion of the optical system of FIG. 2, and additionally showing the ray paths through the lens at a high look angle.

FIGS. 3 and 4, which omit the elements of the optical system 28 other than the window 24 and the transmission optical corrector 34, illustrate ray paths 44 through the window 24 and the transmission optical corrector 34 for a low look angle (FIG. 3) and a high look angle (FIG. 4). The optical characteristics of the transmission optical corrector 34 vary according to the look angle $\theta_L$.

Three transmission optical properties of the transmission optical corrector 34 that may be selectively spatially varying are of particular interest, the index of refraction, the diffractive characteristics, and the optical absorption.

The index of refraction is a measure of the phase velocity of light in the medium, and thence a measure of the degree to which the direction of the light path 44 is altered as it passes through a unit thickness of the curved transmission optical corrector 34. A gradient-index-of-refraction (GRIN) transmission material in the physical form of the transmission optical corrector 34 may have its index of refraction selectively varied parallel to the boresight axis 26, termed an axial gradient. The index of refraction may also or instead be selectively varied as a function of distance from the boresight axis 26, termed a radial gradient, or as a function of distance from a plane containing the boresight axis 26, termed a y-axis gradient. The index of refraction may be varied in other manners as well. The manner and magnitude of the spatial variation of the index of refraction depends upon the specific design of the optical system 28, and therefore cannot be specified in a general sense. The manner and magnitude of the spatial variation may be determined by known, commercially available types of ray-tracing software, such as the Code V$^R$ program, applied to the specific optical system 28 of interest.

Techniques for manufacturing gradient-index-of-refraction materials are known, and such materials are available commercially. Examples are GRADIUM™ glass for visible applications, and ZnS/ZnSe for infrared applications. The transmission optical corrector 34 may be manufactured by producing or purchasing a block of the transparent material of construction having the desired axial and/or radial gradient in the index of refraction, and then fabricating the transmission optical corrector 34 to the required shape from that block of material by any operable technique, an example being diamond point turning.

Figure 5:
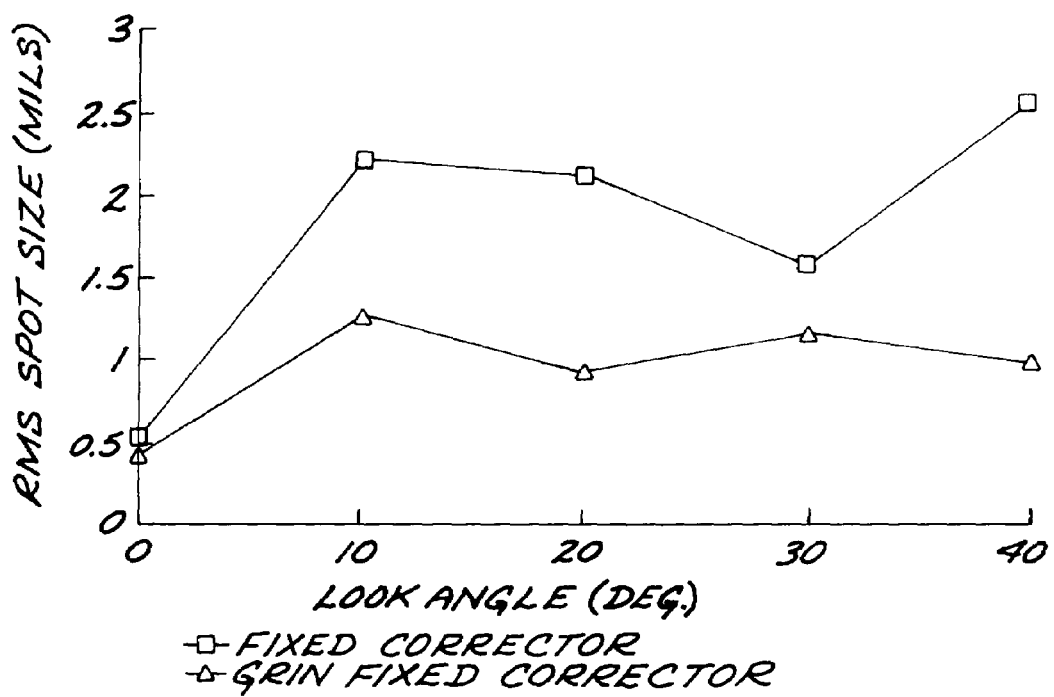
FIG. 5 is a calculated graph of RMS spot size as a function of look angle, for a fixed transmission optical corrector and for a fixed transmission optical corrector having a gradient index of refraction.

FIG. 5 presents the results of a computer calculation of the RMS spot size (in mils, or thousandths of an inch) of a standard image as a function of the look angle in degrees, for two cases. In each case, the window 24 was an elliptically shaped conformal dome with a fineness ratio of 1.5 and made of BK7™ glass. The wavelength of the light was 500 nm. In the "Fixed Corrector" case, the transmission optical corrector 34 was a fixed dome, also made of the BK7 glass, whose shape was optimized for minimal RMS spot size in the image, as a function of the look angle. In the "GRIN Fixed Corrector", the transmission optical corrector 34 was rotationally symmetric. The shape of the corrector and the index of refraction of the material of construction of the "gradient-index" glass were allowed to vary about a base index of 1.5 and a step size of 0.02, and were optimized for minimal RMS spot size. (Thus, the shapes of the Fixed Corrector and the GRIN Fixed Corrector are, in general, not the same because they are optimized under the conditions of no variation in the index of refraction and variation in the index of refraction, respectively.) FIG. 5 shows the results for the two cases. The optimized GRIN Fixed Corrector had an RMS spot size that was, for many look angles, one-half or less of the size of the RMS spot size for the optimized Fixed Corrector in which the index of refraction was constant and not allowed to vary.

Figure 8:
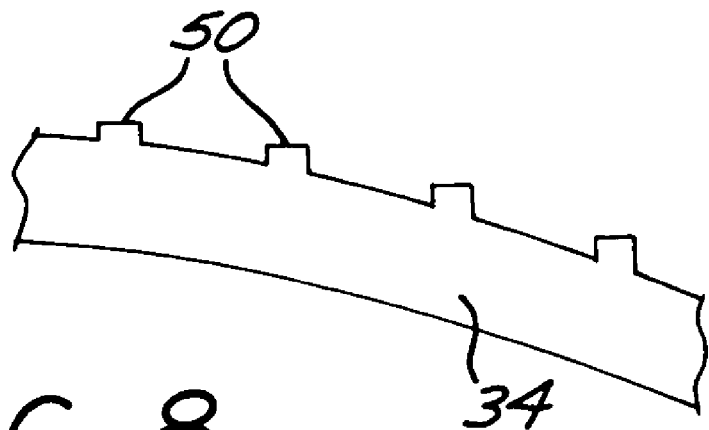
FIG. 8 is a fragmentary schematic sectional view through the transmission optical corrector, with a diffractive on a surface of the transmission optical corrector.
Figure 9:
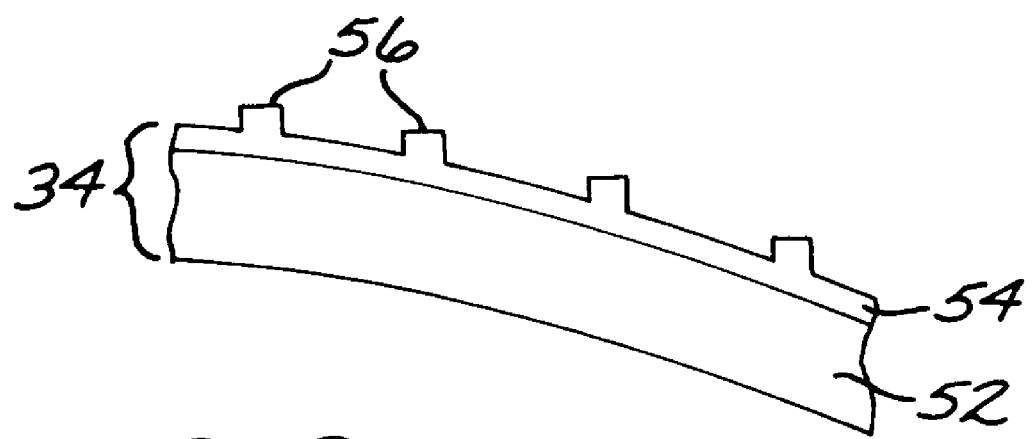
FIG. 9 is a fragmentary schematic sectional view through the transmission optical corrector, with a diffractive on a surface of an overlay applied to the transmission optical corrector.

Spatially varying diffractive effects may be produced using either a diffractive having a diffractive optical element (DOE) and/or a holographic optical element (HOE) on the transmission optical corrector 34. The optical properties of the transmission optical corrector 34 is effectively overlaid with the spatially varying DOE or the HOE to improve the optical performance of the transmission optical corrector 34. The "overlay" may be accomplished by either a modification to the transmission optical corrector 34 itself, as illustrated in FIG. 8, or the application of a separate, usually very thin, stand-alone diffractive overlay element to the surface of the transmission optical corrector 34, as illustrated in FIG. 9. In each case, a light wavefront passing through the DOE or the HOE has an optical path difference induced across it. There is a slight diffraction of the light as it passes through the diffractive.

In the approach of FIG. 8, the transmission optical corrector 34 has a pattern of the diffractive elements 50 on a surface thereof. In the DOE, the surface of the transmission optical element 34 is patterned with a series of ridges or other diffractive feature on a scale comparable with the wavelength of the light to create diffraction effects, to define the diffractive elements 50. The diffractive elements 50 of the DOE may be applied to either the front surface of the transmission optical corrector 34, which is nearest the window 24, or the back surface, which is furthest from the window 24. The diffractive of the DOE may be produced on the surface of the transmission optical corrector 34 by any operable approach. Examples of such techniques include diamond point turning, a photolithographic process in which the surface is etched, the exposing and developing of a photopolymer material applied to the surface, and, in the case of a transmission optical corrector 34 made of plastic, by molding the diffractive into the surface. In the HOE, diffraction effects are obtained by spatially varying the bulk properties of the optical material. The HOE is typically produced by light interference from a laser source in the material of the transmission optical corrector 34. For example, dichromated gelatin may be used as the bulk material that changes in properties at the local level through intense patterns of light.

In the approach of FIG. 9, a stand-alone overlay 54 has a pattern of the diffractive elements 56 thereon. The overlay 54 is normally fabricated with the diffractive elements 56 thereon, and then the overlay 54 is applied to the surface of a base piece 52, to form the transmission optical corrector 34, and fixed in place with an optical cement or the like. The overlay 54 is preferably made thin so as not to distort the light passing therethrough. The diffractive elements 56 are usually cast into the overlay 54 when it is formed. A holographic optical element may also or instead be fabricated in the overlay by the techniques discussed above.

The use and design of the pattern and shape of diffractives formed of diffractive elements (both DOEs and HOEs) is known in the art for other purposes, see, for example, Warren J. Smith, *Modern Optical Engineering*, McGraw Hill, pages 296–297 and 413–418 (2000); Michael J. Hayford, "Optical system design using holographic optical elements," *Proc of SPIE*, vol. 0531, *Geometric Optics*, ed. Fischer, Price, Smith, pages 241–255 (January 1985); C. William Chen, "Application of diffractive optical elements in visible and infrared optical systems," *Critical Review Vol. CR41, Lens Design*, ed. Warren J. Smith, pages 158–172 (January 1992); and L. D. Foo et al., "Design Examples of Hybrid Refractive-Diffractive Lenses," *Proc. of SPIE Vol. 1168, Current Developments in Optical Engineering and Commercial Optics*, ed. R. E. Fischer et al., pages 117–125 (December 1989). The disclosures of all of these publications are incorporated by reference.

FIG. 6 presents the results of a computer calculation of the RMS spot size of an image as a function of the look angle, for two cases. In each case, the window 24 was an elliptically shaped conformal dome with a fineness ratio of 1.5 and made of magnesium fluoride. The wavelength of the light was 3–5 micrometers, an infrared waveband. In the "Fixed Corrector" case, the transmission optical corrector 34 was a fixed, rotationally symmetric optical element, also made of magnesium fluoride, whose shape was optimized using even polynomial aspheric surfaces for minimal RMS spot size in the image, as a function of the look angle. In the "Fixed Corrector with Diffractive Surfaces", the transmission optical corrector 34 was also a fixed dome, but a diffractive element were added to the transmission optical corrector 34. The diffractive element had an axisymmetric diffractive profile. The diffractive imparted a phase change to the light as a function of the distance from the optical axis. The diffractive could be physically constructed as a kinoform diffractive, a binary diffractive, a multilevel diffractive, or a hologram. The shape of the dome and the coefficients describing the diffractive surface were allowed to vary and were optimized for minimal RMS spot size. FIG. 6 shows the results for the two cases. The optimized Fixed Corrector with Diffractive Surfaces had an RMS spot size that was in all cases less than that for the optimized Fixed Corrector which had no diffractive thereon.

The optical absorption may be spatially varied to absorb those rays which contribute the most to distortion. The "optical absorption" as used herein is the reduction in the intensity of the light passing through a unit thickness of the transmission optical corrector 34. The preferred approach is to increase the optical absorption in the wavelength of interest for the outermost rays, while permitting sufficient light to pass to achieve the image. In the case of the cylindrically symmetric transmission optical corrector 34, the absorption of the transmission optical corrector 34 is increased with increasing radius from the boresight axis 26. The increase in absorption is accomplished either by a surface coating on one or both of the surfaces of the transmission optical corrector 26 after it is manufactured, or by introducing an absorptive additive into the material of the transmission optical corrector 34 when it is manufactured.

As discussed previously, the selectively nonuniform index of refraction is associated with the material of construction, and thence the interior, of the transmission optical corrector 34. The selectively nonuniform diffractive is associated with the surface or the interior of the transmission optical corrector 34. The selectively nonuniform optical absorption is associated with either a surface or a bulk modification. These approaches may therefore be applied independently or together. FIG. 7 presents the results of a computer calculation of the RMS spot size of the standard image as a function of the look angle for the same calculational conditions as those underlying FIG. 5. The Fixed Corrector and GRIN Fixed Corrector results from FIG. 5 are repeated. In addition, a "GRIN with Diffractive" curve is shown for the case where a diffractive is applied to the surface of the GRIN Fixed Corrector and optimized in the manner discussed in relation to FIG. 6, thereby utilizing more than one of the selectively nonuniform transmission optical properties. The addition of the diffractive improves the optical performance even further over that of the GRIN Fixed Corrector, so that the RMS spot size is further reduced. The further improvement is small for the smaller look angles, but significantly increases for look angles (and field of regard) greater than about 10 degrees, and particularly for look angles (and field of regard) greater than about 20 degrees. At the highest look angle of 40 degrees in this calculation, the spot size of the GRIN with Diffractive was about ⅕ that of the Fixed Corrector, a major improvement.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An optical system, comprising:
  a window having a nonspherically curved outer surface and a curved inner surface;
  a transmission optical corrector adjacent to the curved inner surface of the window and having an optical corrector shape responsive to a shape of the window, wherein the transmission optical corrector has a selectively nonuniform passive transmission optical property, wherein the optical property is a spatially varying index of refraction of the transmission optical corrector, or a spatially varying absorption property of the transmission optical corrector;

an optical train positioned such that the transmission optical corrector lies between the window and the optical train, wherein the optical train includes at least one optical element operable to alter an optical ray incident thereon; and a sensor disposed to receive the optical ray passing sequentially through the window, the transmission optical corrector, and the optical train.

2. The optical system of claim 1, wherein the optical property is the spatially varying index of refraction of the transmission optical corrector.

3. The optical system of claim 1, wherein the optical property is the spatially varying absorption property of the transmission optical corrector.

4. The optical system of claim 1, wherein the transmission optical corrector is a fixed optical corrector.

5. The optical system of claim 1, wherein the transmission optical corrector is a movable optical corrector.

6. The optical system of claim 1, wherein the sensor has a field of regard of at least about 10 degrees through the window, the transmission optical corrector, and the optical train.

7. The optical system of claim 1, wherein the window is a window in a flight vehicle.

8. The optical system of claim 1, wherein the sensor is a manufactured sensor.

9. The optical system of claim 1, wherein the sensor is a human eye.

10. An optical system, comprising:
a window having a nonspherically curved outer surface and a curved inner surface;
a transmission optical corrector adjacent to the curved inner surface of the window and having an optical corrector shape responsive to a shape of the window, wherein the transmission optical corrector has a selectively spatially varying index of refraction;
an optical train positioned such that the transmission optical corrector lies between the curved window and the optical train, wherein the optical train includes at least one optical element operable to alter an optical ray incident thereon; and
a sensor disposed to receive the optical ray passing sequentially through the window, the transmission optical corrector, and the optical train.

11. The optical system of claim 10, wherein the transmission optical corrector is a fixed optical corrector.

12. The optical system of claim 10, wherein the transmission optical corrector is a movable optical corrector.

13. The optical system of claim 10, wherein the transmission optical corrector is an arch optical corrector made of transparent material having a curvature different from a curvature of the window.

14. The optical system of claim 10, wherein the sensor has a field of regard of at least about 20 degrees through the window, the transmission optical corrector, and the optical train.

15. An optical system, comprising:
a window having a nonspherically curved outer surface and a curved inner surface;
a transmission optical corrector adjacent to the curved inner surface of the window and having an optical corrector shape responsive to a shape of the window, wherein the transmission optical corrector has a diffractive thereon;
an optical train positioned such that the transmission optical corrector lies between the curved window and the optical train, wherein the optical train includes at least one optical element operable to alter an optical ray incident thereon; and
a sensor disposed to receive the optical ray passing sequentially through the window, the transmission optical corrector, and the optical train, wherein the sensor has a field of regard of at least about 10 degrees through the window, the transmission optical corrector, and the optical train.

16. The optical system of claim 15, wherein the transmission optical corrector is a fixed optical corrector.

17. The optical system of claim 15, wherein the transmission optical corrector is a movable optical corrector.

18. The optical system of claim 15, wherein the transmission optical corrector is an arch optical corrector made of transparent material having a curvature different from a curvature of the window.

19. The optical system of claim 15, wherein the sensor has a field of regard of at least about 20 degrees through the window, the transmission optical corrector, and the optical train.

20. The optical system of claim 15, wherein the window is a window in a flight vehicle.

21. The optical system of claim 15, wherein the sensor is a manufactured sensor.

22. The optical system of claim 15, wherein the sensor is a human eye.

23. An optical system, comprising:
a window having a nonspherically curved outer surface and a curved inner surface;
a transmission optical corrector adjacent to the curved inner surface of the window and having an optical corrector shape responsive to a shape of the window, wherein the transmission optical corrector is a movable optical corrector, and wherein the transmission optical corrector has a diffractive thereon;
an optical train positioned such that the transmission optical corrector lies between the curved window and the optical train, wherein the optical train includes at least one optical element operable to alter an optical ray incident thereon; and
a sensor disposed to receive the optical ray passing sequentially through the window, the transmission optical corrector, and the optical train.

24. The optical system of claim 23, wherein the transmission optical corrector is an arch optical corrector made of transparent material having a curvature different from a curvature of the window.

25. The optical system of claim 23, wherein the sensor has a field of regard of at least about 20 degrees through the window, the transmission optical corrector, and the optical train.

26. The optical system of claim 23, wherein the window is a window in a flight vehicle.

27. The optical system of claim 23, wherein the sensor is a manufactured sensor.

28. The optical system of claim 23, wherein the sensor is a human eye.

29. An optical system, comprising:
a window having a nonspherically curved outer surface and a curved inner surface;

a transmission optical corrector adjacent to the curved inner surface of the window and having an optical corrector shape responsive to a shape of the window, wherein the transmission optical corrector is an arch optical corrector made of transparent material having a curvature different from a curvature of the window, and wherein the transmission optical corrector has a diffractive thereon;

an optical train positioned such that the transmission optical corrector lies between the curved window and the optical train, wherein the optical train includes at least one optical element operable to alter an optical ray incident thereon; and a sensor disposed to receive the optical ray passing sequentially through the window, the transmission optical corrector, and the optical train.

30. The optical system of claim 29, wherein the transmission optical corrector is a fixed optical corrector.

31. The optical system of claim 29, wherein the transmission optical corrector is a movable optical corrector.

32. The optical system of claim 29, wherein the sensor has a field of regard of at least about 20 degrees through the window, the transmission optical corrector, and the optical train.

33. The optical system of claim 29, wherein the window is a window in a flight vehicle.

34. The optical system of claim 29, wherein the sensor is a manufactured sensor.

35. The optical system of claim 29, wherein the sensor is a human eye.

* * * * *